(12) United States Patent
Cheong et al.

(10) Patent No.: US 10,778,990 B2
(45) Date of Patent: Sep. 15, 2020

(54) EMBEDDED CODEC CIRCUITRY FOR RANDOMIZED REFINEMENT OF UNCODED-BITS

(71) Applicant: SONY CORPORATION, Tokyo (JP)

(72) Inventors: Hye-Yeon Cheong, San Jose, CA (US); Ali Tabatabai, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 116 days.

(21) Appl. No.: 16/194,797

(22) Filed: Nov. 19, 2018

(65) Prior Publication Data

US 2020/0162746 A1    May 21, 2020

(51) Int. Cl.
*H04N 19/176* (2014.01)
*H04N 19/13* (2014.01)
*H04N 19/124* (2014.01)

(52) U.S. Cl.
CPC ......... *H04N 19/176* (2014.11); *H04N 19/124* (2014.11); *H04N 19/13* (2014.11)

(58) Field of Classification Search
CPC .... H04N 19/146; H04N 19/167; H04N 19/17; H04N 19/176; H04N 19/184; H04N 19/34; H04N 19/593; H04N 19/65; H04N 19/91
USPC ..................................................... 375/240.22
See application file for complete search history.

(56) References Cited

U.S. PATENT DOCUMENTS

| | | | |
|---|---|---|---|
| 6,505,299 B1 | 1/2003 | Zeng et al. | |
| 8,401,082 B2 | 3/2013 | Ye et al. | |
| 9,237,350 B2 | 1/2016 | Cheong et al. | |
| 2007/0078646 A1* | 4/2007 | Lei | G10L 19/0208 704/200.1 |
| 2014/0355675 A1* | 12/2014 | He | H04N 19/82 375/240.12 |
| 2016/0234529 A1 | 8/2016 | Iqbal | |

FOREIGN PATENT DOCUMENTS

EP          1194895 B1      5/2003

* cited by examiner

*Primary Examiner* — Tat C Chio
*Assistant Examiner* — Kathleen V Nguyen
(74) *Attorney, Agent, or Firm* — Chip Law Group

(57) ABSTRACT

An embedded codec (EBC) circuitry includes encoder circuitry to determine a refinement start position in a bit-plane of an encoded data block based on a random number. The refinement start position is a position in the bit-plane based on a value of the random number. The encoder circuitry determines a refinement order in the bit-plane for refining un-coded bits present in the bit-plane, based on the determined refinement start position and a refinement step size. The refinement order is a sequence of positions of the un-coded bits in the bit-plane that will be refined in that sequence. The encoder circuitry refines the un-coded bits by allocating a refinement bit at the refinement start position in the bit-plane and then followed by the allocation of subsequent refinement bits in the determined refinement order.

19 Claims, 5 Drawing Sheets

EMBEDDED CODEC CIRCUITRY FOR RANDOMIZED REFINEMENT OF UNCODED-BITS

CROSS-REFERENCE TO RELATED APPLICATIONS/INCORPORATION BY REFERENCE

None.

FIELD

Various embodiments of the disclosure relate to image and video compression technologies. More specifically, various embodiments of the disclosure relate to embedded codec circuitry for randomized refinement of un-coded bits.

BACKGROUND

With recent advancements in imaging technologies, there is an increasing demand for on-chip codecs in image capturing and display devices that can handle compression and storage of different images or video in wide variety of image resolutions (e.g., low to high resolution images/video). Currently, an image or video may be subjected to multiple coding techniques, for example, transform coding, residual prediction, quantization, entropy coding, and the like, to achieve a desired compression. Typically, after the entropy coding, there may be still un-coded bits available in bit-planes within a bit budget of an encoded image block. In certain scenarios, some of the un-coded bits may be refined by allocating refinement bits in a fixed refinement order for each encoded image block. In such scenarios, the allocation of refinement bits in the fixed refinement order may result in coding artifacts and/or adversely impact quality of encoded image. This may further result in compression inefficiency and sub-optimal memory usage, especially in on-chip codes where it is desirable to achieve an area efficiency with respect to throughput while minimizing an on-chip memory usage.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An embedded codec (EBC) circuitry and a method for randomized refinement of un-coded bits are provided, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in a method and embedded codec (EBC) circuitry for randomized refinement of un-coded bits. The EBC circuitry may include encoder circuitry that encodes one dimensional (1 D) image block to generate an encoded data block having a plurality of bit-planes. The plurality of bit-planes comprise encoded bits as well as un-coded bits. The disclosed EBC circuitry determines a refinement start position in at least one bit-plane of the plurality of bit-planes based on a random number. The refinement start position may be a position within a bit-plane based on a value of the random number. The un-coded bits are refined by allocation of refinement bits in the bit-plane, starting with the refinement start position and proceeding to the next position that may be shifted by a refinement step size. This ensures a uniform distribution of refinement bits in the bit-plane, i.e. an equal probability distribution of the refinement bits in the bit-plane, as compared to conventional fixed refinement order method. A different refinement order may be obtained for different encoded data blocks based on the refinement start position and the refinement step size. The different refinement order or a random refinement order for each encoded data block significantly reduces coding artifacts that may occur if any conventional refinement scheme which has a fixed refinement order, is used to refine the encoded data block.

Figure 1:
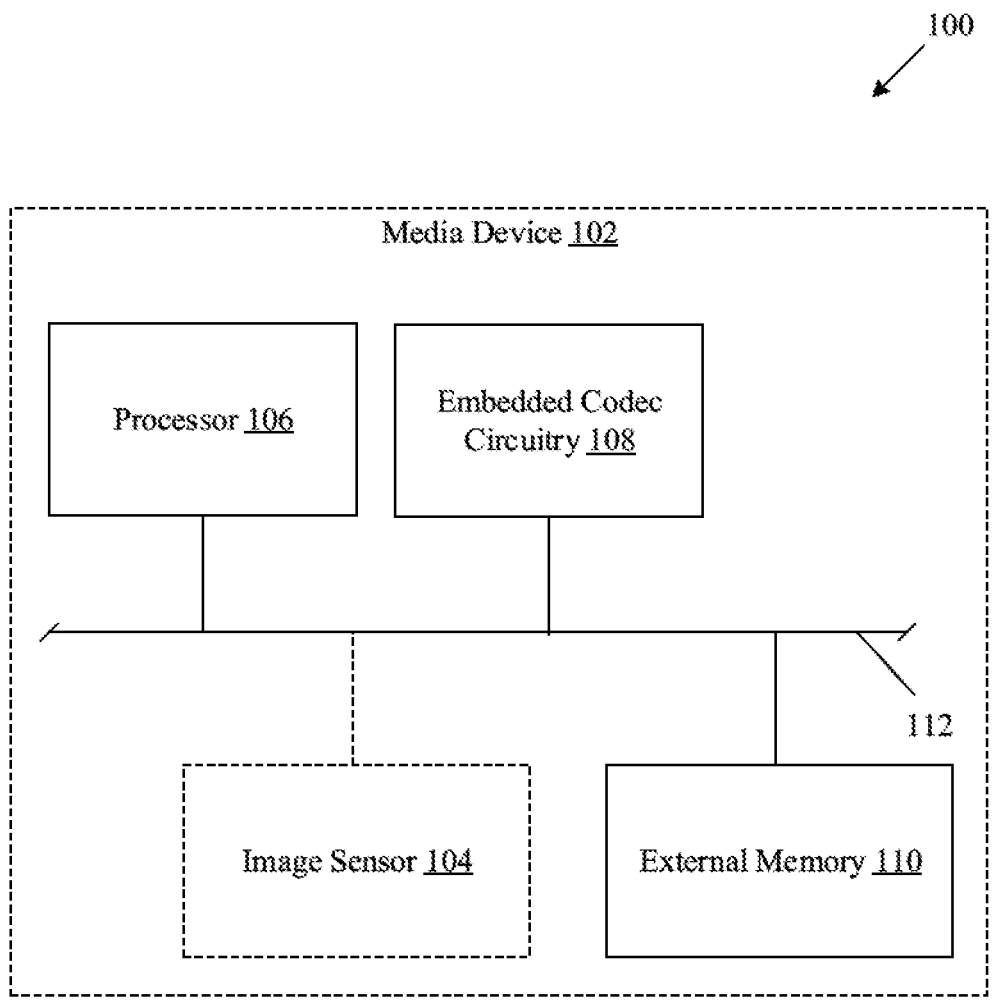
FIG. 1 is a block diagram that illustrates an exemplary media device with an embedded codec (EBC) circuitry and other circuitries for randomized refinement of un-coded bits, in accordance with an embodiment of the disclosure.

FIG. 1 is a block diagram that illustrates an exemplary media device with an embedded codec (EBC) circuitry and other circuitries for randomized refinement of un-coded bits, in accordance with an embodiment of the disclosure. With reference to FIG. 1, there is shown a media device 102 that includes a processor 106, an embedded codec (EBC) circuitry 108, and an external memory 110. In some embodiments, an image sensor 104 may be communicatively coupled to the processor 106, the EBC circuitry 108, and the external memory 110. There is further shown a system bus 112 that interconnects the image sensor 104, the processor 106, the EBC circuitry 108, and the external memory 110.

The media device 102 may comprise suitable logic, circuitry, and interfaces that may be configured to store uncompressed raw images and/or videos as encoded (i.e. compressed) images and/or videos in the external memory 110. The media device 102 may be further configured to manage encoding as well as decoding of media content (for example, encoded images and/or videos) and further playback of the decoded media content at the media device 102. The media device 102 may include a dedicated on-chip codec (such as the EBC circuitry 108) for an offline (without the need for Internet/network) processing and compression/decompression of images/video. In some embodiments, the media device 102 may also include one or more image sensors (such as the image sensor 104) to capture images in a raw image file format, which is an uncompressed file format. In such cases, the captured image may be encoded by the EBC circuitry 108 of the media device 102. Examples of the media device 102 may include, but are not limited to, a digital camera, a portable communication device (e.g. laptops, smartphones, tablets, phablets, smart watches, smart glasses, etc.), a media server, a workstation, a desktop computer, and augmented reality/Virtual Reality/Mixed Reality (AR/VR/MR) devices.

Although not shown in FIG. 1, the media device 102 may also include a network interface that may be configured to manage sharing of encoded and/or raw uncompressed images and/or videos with other peripheral or peer-connected devices, through a communication network (also not shown). The detailed description of the network interface and the communication network has been omitted from the present disclosure for the sake of brevity.

The image sensor 104 may comprise suitable logic, circuitry, and interfaces that may be configured to capture a raw uncompressed image or a sequence of raw uncompressed images of a scene in a field-of-view (FOV) of the image sensor 104. The image sensor 104 may be implemented as an active pixel sensor, such as a complementary-metal-oxide semiconductor (CMOS) sensor. In such implementation, the image sensor 104 may be configured to execute progressive scan (line-by-line) of each row or column of pixels (one dimensional (1D) pixel-array or 1D image block) on a sensor core of the CMOS sensor. The progressive scan may be a vertical scan (column wise) or a horizontal scan (row wise). In some embodiments, instead of an active pixel sensor, the image sensor 104 may be implemented as one of a passive pixel sensor (such as a charged coupled device (CCD) sensor, an oversampled binary image sensor, a planar Fourier capture array (PFCA), a back-illuminated (BSI or BI) sensor, and the like. Although not shown, the image sensor 104 may also include a specialized microprocessor (or a microcontroller) that may be configured to operate in accordance with image data from the image sensor 104, a graphic processing unit (GPU) to process images stored in a frame buffer, and/or a memory integrated with the image sensor 104.

The processor 106 may comprise suitable logic, circuitry, and interfaces that may be configured to execute a set of instructions stored in a dedicated memory (e.g., the external memory 110 or an on-chip memory in the EBC circuitry 108). The processor 106 may be implemented based on a number of processor technologies known in the art. Examples of the processor 106 may include, but are not limited to, a Graphical Processing Unit (GPU), a co-processor (such as a specialized image co-processor) for a processor, a specialized digital signal processor, a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The EBC circuitry 108 may comprise suitable logic, circuitry, and interfaces that may be configured to encode a 1D image block (e.g., 16×1 or a 8×1 image block) as per a specific compression factor to generate an encoded data block. The EBC circuitry 108 may be further configured to refine the generated data block to improve the resolution, in response to instructions received at the EBC circuitry 108. In some embodiments, the 1D image block may be part of an input image (i.e. a raw uncompressed image) or a pixel array (row or column) retrieved directly from a read out register of the image sensor 104, following a row-wise or a column-wise scan by the image sensor 104. The EBC circuitry 108 may further manage storage of a bit-stream of refined data block in the external memory 110 or may manage transfer of the bit-stream of refined data block to other media devices via dedicated communication networks.

The EBC circuitry 108 may be implemented as a specialized hardware encoder/decoder interfaced with the other computational circuitries of the media device 102. In such implementation, the EBC circuitry 108 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with another embodiment, the EBC circuitry 108 may be also interfaced with a graphical processing unit (GPU) to parallelize operations of the EBC circuitry 108. In accordance with yet another embodiment, the EBC circuitry 108 may be implemented as a combination of programmable instructions stored in a memory and logical units (or programmable logic units) on a hardware circuitry of the media device 102.

The external memory 110 may comprise suitable logic, circuitry, and interfaces that may be configured to store an input image (uncompressed raw or encoded) or a sequence of input images. The external memory 110 may be further configured to act as an image buffer to store raw uncompressed 1D image blocks retrieved directly from the image sensor 104. Additionally, the external memory 110 may store instructions associated with sequential encoding/decoding schemes that may be applied, by the EBC circuitry 108, to encode the 1D image block to generate an encoded data block. In an exemplary embodiment, the external memory 110 may be a persistent storage memory or a dynamic random access memory (DRAM) that may be externally interfaced with the EBC circuitry 108. In another exemplary embodiment, the external memory 110 may be static random access memory (SRAM) circuits that may be externally interfaced with the EBC circuitry 108. Further examples of implementation of the external memory 110 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

In some embodiments, the EBC circuitry 108 may also provide support (e.g., a backward compatibility) for different other codec standards that may include Advanced Video Codec (AVC)/Media Experts Group (MPEG-4/AVC) or H.264, MPEG-4/HEVC or H.265, and the like. Additionally, the video codec may be supported by other codec libraries that may include FFmpeg, Xvid, DIVx, VP1-9, Windows Media Codec, FFavs, and the like.

The system bus 112 may be a hardware bus that may include a set of data channels (or conductive paths) to different components of the media device 102. Alternatively stated, the system bus 112 may interconnect at least data ports, address ports, and control signal ports of different components of the media device 102. For example, the system bus 112 may interconnect the image sensor 104, the processor 106, the EBC circuitry 108, the external memory 110, and other circuitries to each other. The system bus 112 may be configured to facilitate a serial data communication or parallelized data communication between different components on-board the media device 102. Examples of the system bus 112 may include an 8-bit parallel single system bus, a 16-bit parallel single system bus, a 32-bit parallel single system bus, a 64-bit parallel single system bus, a serial data bus, and the like.

In operation, a plurality of 1D image blocks may be received by the external memory 110 of the media device 102. The plurality of 1D image blocks may correspond to the input image, which may be partitioned to generate the plurality of 1D image blocks. In some embodiments, the plurality of 1D image blocks may be retrieved directly from a read-out register of an on-chip image sensor (such as the image sensor 104) or a camera device interfaced with the media device 102. In other embodiments, the plurality of 1D image blocks may be retrieved from an uncompressed raw input image stored in a persistent storage, such as the external memory 110, of the media device 102 or received externally from other media storage devices, such as cameras, data servers, etc.

The EBC circuitry 108 may be configured to receive the plurality of 1D image blocks from the external memory 110 or directly from the read out register of the image sensor 104. The EBC circuitry 108 may be configured to execute a sequential encoding scheme on a 1D image block of the plurality of 1D image blocks to generate a bit-stream of encoded 1D image block. The bit-stream of encoded 1D image block may include header information that may indicate the sequential encoding scheme applied to encode the 1D image block to generate the bit-stream of encoded 1D image block. In one implementation, the sequential encoding scheme may include a sequential application of quantization, followed by an entropy coding scheme, and a refinement coding scheme on each 1D image block of the plurality of 1D image blocks. In another implementation, the sequential encoding scheme may include a sequential application of quantization, followed by a residual prediction scheme, an entropy coding scheme, and a refinement coding scheme on each 1D image block of the plurality of 1D image blocks.

The EBC circuitry 108 may be further configured to quantize a plurality of input pixel values in each 1D image block to generate a plurality of quantized values in each 1D image block of the plurality of 1D image blocks. The plurality of 1D image blocks of quantized levels may be stored in a memory, such as the external memory 110 or an on-chip memory (e.g., a dedicated SRAM, DRAM, or an on-chip cache) by the EBC circuitry 108.

The EBC circuitry 108 may be further configured to encode each 1D image block of the plurality of 1D image blocks by application of an entropy coding scheme to generate an encoded data block corresponding to each 1D image block of the plurality of 1D image blocks. The encoded data block may include a plurality of bit-planes. For example, a 16×1 image block may be encoded to generate a 16×8 data block, where '16' specifies the data block size and '8' specifies the number of bit-planes in the data block. In 8 bit-planes, only 4 bit-planes may include encoded bits and remaining 4 bit-planes may include un-coded bits (positions in the bit-planes where bits may not be available). The entropy coding scheme may include, but is not limited to, a Huffman coding scheme, an exponential Golomb coding scheme, a progressive Golomb coding scheme, a Golomb-Rice coding scheme, and a combination of the Huffman coding scheme and the exponential Golomb coding scheme.

In order to refine the un-coded bits in the data block, the EBC circuitry 108 may be further configured to determine a refinement start position in a bit-plane of the plurality of bit-planes of the encoded data block. The plurality of bit-planes of the encoded data block may that include un-coded bits. The EBC circuitry 108 may be further configured to determine a refinement order for allocating refinement bits in the bit-plane of the plurality of bit-planes of the encoded data block. The refinement start position may be determined based on a random number and a random bit. The random number may be any positive integral value, but the random bit may have either a binary value '0' or a binary value '1'. For a random number, the refinement start position may be determined as either a first position or a second position based on '0' or '1' value of the random bit. The determination of the refinement start position based on the random number and the random bit ensures that the refinement bits are uniformly distributed in the bit-plane. The probability of placing a refinement bit at a particular position in the bit-plane is equal for all the positions in the bit-plane. The refinement order may be determined based on a refinement step size between any two un-coded bits that will be refined in a sequential order. The refinement step size may be determined such as it is not a factor of the data block size. For example, if the data block size is 16, then the refinement step size can be taken as either 3 or 5 (which are not multiple of 16) and not 4 or 8. In other words, a multiple value or simply a multiple of the refinement step size is not equal to the data block size. The refinement order provides sequence of positions of un-coded bits in the bit-plane that will be refined in that sequence.

The EBC circuitry 108 may be further configured to refine un-coded bits in a bit-plane of the plurality of bit-planes based on the refinement order. The refinement process starts with allocation of a refinement bit at the refinement start position in the bit-plane, and then proceeds to next position in the bit-plane that may be shifted from the refinement start position by the refinement step size. This continues until a number of refinement bits are allocated in the bit-plane, which may be decided based on available bit-budget.

The EBC circuitry 108 may be further configured to generate a bit-stream for each 1D image block of the plurality of 1D image blocks based on the refinement of the data block corresponding to each 1D image block. The generated bit-stream may include a plurality of encoded bits, refinement bits and un-coded bits for each data block.

In accordance with another embodiment, an EBC decoder circuitry (not shown in FIG. 1) of the EBC circuitry 108 may be configured to pre-store different coding tables (e.g., custom coding tables for Huffman encoding schemes, Exponential-Golomb encoding schemes, or signaling bit tables) and quantization tables. Therefore, the bit-stream of encoded 1D image block may need not include different coding tables and quantization tables.

In accordance with an embodiment, the bit-stream of encoded 1D image block may be stored as part of an input image (such as a 2D image), a complete image, or a video portion, in the memory, such as the external memory 110 or an on-chip memory in the EBC circuitry 108. In one implementation, the processor 106 may be configured to transfer the bit-stream of encoded 1D image block, via the system bus 112, to a frame buffer (or a frame store) of a display circuitry (e.g., a video card) communicatively interfaced with the system bus 112 of the media device 102. The frame buffer may act as a compressed frame buffer for the display circuitry. The display circuitry (not shown in FIG. 1) may decode and further utilize the bit-stream of encoded bit-stream of 1D image block to display a patch of image at the media device 102. In another implementation, the processor 106 may be configured to transfer the bit-stream of encoded 1D image block, via the system bus 112, to a decoder buffer, such as a decoder picture buffer (DPB) of a video decoder, a buffer memory for an image decoder, or a coded picture buffer (CPB) of a video codec, in the media device 102.

In an exemplary implementation, the media device 102 may be a camera, such as a digital video camera or a digital image camera, and the bit-stream of encoded 1D image block may correspond to a 1D array of pixel values that are directly received from a read-out register of a CMOS sensor in the camera. In an exemplary embodiment, the EBC circuitry 108 may be implemented in the CMOS sensor circuitry.

Figure 2:
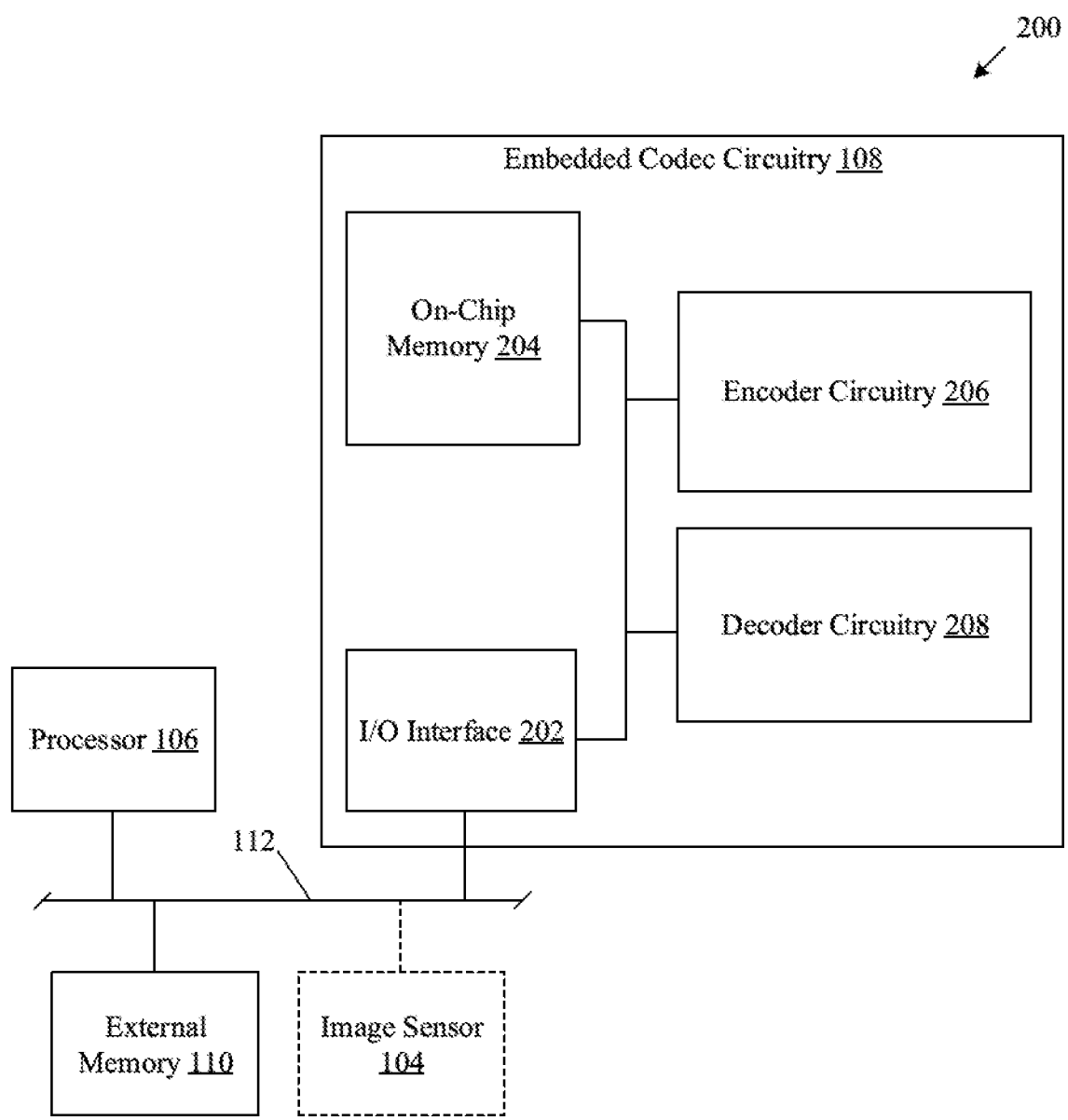
FIG. 2 is a block diagram that illustrates the EBC circuitry of FIG. 1 with various peripheral components for randomized refinement of un-coded bits, in accordance with an embodiment of the disclosure.

FIG. 2 is a block diagram that illustrates an embedded codec (EBC) circuitry with various peripheral components for randomized refinement of un-coded bits, in accordance with an embodiment of the disclosure. FIG. 2 is explained in conjunction with elements from FIG. 1. With reference to FIG. 2, there is shown a block diagram 200 of the EBC circuitry 108. The EBC circuitry 108 may include an Input/output (I/O) interface 202, an on-chip memory 204, an encoder circuitry 206, and a decoder circuitry 208. In the block diagram 200, there is also shown the image sensor 104, the processor 106, and the external memory 110 communicatively coupled to the EBC circuitry 108, via the system bus 112. In some embodiments, the processor 106 and the external memory 110 may be implemented inside the EBC circuitry 108, without a deviation from the scope of the disclosure.

The I/O interface 202 may comprise suitable logic, circuitry, and interfaces that may be configured to manage a plurality of I/O ports to facilitate exchange of communication data from other peripheral circuitries, via the system bus 112, for example, the external memory 110, the processor 106, or the image sensor 104. The communication data may include a bit-stream of the encoded 1D image block, control signals, CPU instructions, and the like. The configuration of the I/O ports may depend on a specification of the EBC circuitry 108, for example, physical I/O pins in an ASIC, FPGA or a SoC chip.

The on-chip memory 204 may comprise suitable logic, circuitry, and interfaces that may be configured to store different operational data (e.g., transform domain data, residual levels, quantization levels, entropy coded bits, refinement bits etc.) that may be utilized by different components of the EBC circuitry 108 to encode the 1D image block and refine the encoded 1D image block. Examples of the operational data stored in the on-chip memory 204 may include, but are not limited to, a bit-stream of encoded 1D image block, transform-domain data, quantized levels, quantized-transformed levels, quantized prediction residual levels, computed variables, and temporary processing data, and 1D/2D image blocks. The on-chip memory 204 may be implemented as a specific memory designed with a defined memory specification, such as a read/write speed, a memory size, fabrication factors, and the like. Examples of the on-chip memory 204 may include, but are not limited to, static random access memory (SRAM), dynamic access memory (DRAM), and Static Dynamic RAM (SD-RAM).

The encoder circuitry 206 may comprise suitable logic, circuitry, and interfaces that may be configured to encode a 1D image block to generate a data block that may include a plurality of encoded bits and a plurality of un-coded bits. The encoder circuitry 206 may also refine the plurality of un-coded bits in at least one bit-plane of the data block to improve compression efficiency or a resolution of the input-ted 1D image block. In some embodiments, the encoder circuitry 206 may be a hardware encoder chip that may be implemented based on one of ASIC, programmable logic devices (PLDs), SOC, FPGA, digital signal processors (DSPs) or other specialized circuitries. In other embodiments, the encoder circuitry 206 may be implemented as a combination of hardware and stored set of instructions in the on-chip memory 204 (for example, instructions based on VHDL or HDL logic).

The decoder circuitry 208 may comprise suitable logic, circuitry, and interfaces that may be configured to decode a bit-stream of encoded 1D image block based on header information of encoded 1D image block. In some embodiments, the decoder circuitry 208 may have pre-stored quantization tables and coding tables that may act as a reference for the decoder circuitry 208 to decode the bit-stream of encoded 1D image block. In some embodiments, the decoder circuitry 208 may be a hardware encoder chip that may be implemented based on one of ASIC, programmable logic devices (PLDs), SOC, FPGA, digital signal processors (DSPs) or other specialized circuitries. In some embodiments, the decoder circuitry 208 may be implemented as a combination of hardware and programmed instructions in the on-chip memory 204 (for example, instructions based on VHDL or HDL logic).

In operation, a plurality of 1D image blocks of pixel values may be stored in the memory, such as the external memory 110 or the on-chip memory 204. The plurality of 1D image blocks may correspond to an input image, which may be partitioned to generate the plurality of 1D image blocks. The encoder circuitry 206 may be configured to quantize the pixel values in a 1D image block of the plurality of 1D image blocks. The encoder circuitry 206 may be further configured to entropy encode the quantized pixel values in the 1D image block of the plurality of 1D image blocks to generate an encoded data block. The data block may include a plurality of bit-planes. After entropy encoding if there are un-coded bits available in the data block, then some of these un-coded bits can be suitably refined to improve the resolution of decoded image form the data block without introducing any artifact. For example, a "16×1" image block may be entropy coded to generate a "16×8" data block that has '8' bit-planes.

In order to refine the un-coded bits in a bit-plane of the plurality of bit-planes, the encoder circuitry 206 may be configured to determine a refinement start position in the bit-plane based on a random number. The determination of the refinement start position based on the random number may ensure that the probability of refining a bit-position in the bit-plane is equal at all the bit-positions in the bit-plane. In order to ensure a uniform distribution of refinement bits in the bit-plane, the refinement start position in the bit-plane may be determined further based on a random bit. In an implementation, the encoder circuitry 206 may be configured to generate the random number based on a number of bits to be refined in the bit-plane and the random bit based on a last bit or last sign bit in the data block.

The encoder circuitry 206 may be configured to determine a refinement step size for the data block based on a block size of the data block. The refinement step size may be determined such that the refinement step size is not a factor of the block size, or the block size is not a multiple of the refinement step size. Thus, the determined refinement step size may ensure that any two bit-positions in the bit-plane do not overlap in the refinement process.

The encoder circuitry 206 may be configured to refine the un-coded bits in the bit-plane by allocating refinement bits in the bit-plane. The allocation of refinement bits may start with the refinement start position and then may proceed to next refinement bit-position, which may be determined by adding refinement step size to the refinement start position. This refinement process may continue until all the refinement bits are allocated in the bit-plane. In a scenario in which the sum of a previous refinement bit-position and the refinement step size exceeds the block size of the data block, a modulus operation may be performed on the sum of the previous refinement bit-position and the refinement step size with respect to the block size, to ensure that the next refinement bit-position is within the bit-plane. The output of the modulus operation may be a position that lie within the bit-plane of the data block.

As an example, an 8×1 image block may be entropy coded to generate a 8×8 data block, where "BPm" represents a bit-plane at a bit plane number "m" in the "8×8" data block, and "n" represents a bit-position in the bit-plane, shown by Table 1 as follows:

TABLE 1

| 8 × 8 Data Block | | | | | | | | |
|---|---|---|---|---|---|---|---|---|
| | | | | n | | | | |
| BPm | 1 | 2 | 3 | 4 | 5 | 6 | 7 | 8 |
| BP1 | 1 | 0 | 1 | 1 | 1 | 1 | 0 | 0 |
| BP2 | 0 | 1 | 0 | 1 | 0 | 0 | 1 | 0 |
| BP3 | 1 | 1 | 1 | | 1 | 0 | 1 | 1 |
| BP4 | 1 | | 0 | | | 1 | 1 | |
| BP5 | | | | | | | | |
| BP6 | | | | | | | | |
| BP7 | | | | | | | | |
| BP8 | | | | | | | | |

It should be noted that the "8×8" data block is different from an "8×8" image block, as "8×8" data block represents a bit-plane representation of an encoded "8×8" image block.

Referring to Table 1, as shown above, the bit-panes represented by "BP1", "BP2", "BP3", and "BP4" may include the encoded bits. "BP5", "BP6", "BP7", and "BP8" may include un-coded bits or bits that are available for refinement. In a scenario in which "BP5" may be selected for refinement and the number of bits to be refined may be '3', then the refinement start position may also be determined as '3'. It should be noted that the refinement start position is not limited to the number of refinement bits, but it may be determined as any positive integral value. The block size of "8×8" data block may be determined by the size of the input 1D image block i.e., '8'. The refinement step size may be determined as '3' i.e., not a factor of '8'. In order to refine the "BP5", the refinement order may be determined by sequentially adding the refinement step size to previous refinement positions. As a first refinement position is '3' and the refinement step size is '3', second refinement position may be determined as '6'. As the second refinement bit-position is '6' and the refinement step size is '3', the third refinement bit-position may be determined as '9', which does not lie within in the "BP5" or any other bit-plane also. Thus, the modulus operation may be performed on '9' that may result in the third bit-position (n) as '1'. Therefore, the refinement order for refining 3 bits (represented by binary value "1") in "BP5" will be 3, 6, and 1 bit-positions as shown, for example, in Table 2.

TABLE 2

| | Refinement bits in bit-plane | | | | | | | |
|---|---|---|---|---|---|---|---|---|
| n | 1 | 2 | 3 | 4 | 5 | 6 | 7 | 8 |
| BP5 | 1 | 0 | 1 | 0 | 0 | 1 | 0 | 0 |

In accordance with an embodiment, the encoder circuitry 206 may be configured to determine the refinement start position based on the following equation (1):

$$1stPos=\{RN+(S*\Sigma_{k=0}^{X-1}k)+(W/2)*RB\}\% W \quad (1)$$

where "1stPos" represents the refinement start position, "RN" represents the random number, "S" represents the refinement step size, "X" represents the number of refinement bits, "W" represents the block size, and "RB" represents the random bit. Referring back to table 1, the refinement start position in the fifth bit plane "BP5" may be also determined based on equation 1 as follows:

$$1stPos=(3+3*(0+1+2)+4*0)\%8=4 \text{ (here, } RN=3, S=3, \text{ and } RB=0).$$

In accordance with an embodiment, the encoder circuitry 206 may be configured to determine the refinement order based on the following equation (2):

$$Ref\_order=(1stPos+S*[0:W-1])\% W \quad (2)$$

where "Ref_order" represents the refinement order, "1stPos" represents the refinement start position, as calculated using the equation 1, "S" represents the refinement step size, and "W" represents the block size. Referring again back to table 1, the refinement order in the BP5 may be also determined based on the equation 2 as follows:

$$Ref\_order=(4\%8=4),(4+3\%8=7), \text{ and } (4+6\%8=2).$$

In accordance with an embodiment, the encoder circuitry 206 may be configured to determine a 1D table matrix that includes elements corresponding to computation of $(S*\Sigma_{k=0}^{X-1}k)$ in the equation 1. The encoder circuitry 206 may be further configured to store the 1D table matrix in the external memory 110 or the on-chip memory 204. The 1D table matrix reduces the computation time as it is not required to compute the value of summation operator every time a new bit-plane has to be refined. Thus, while refining a bit-plane in the data block instead of computing summation operator every time, the encoder circuitry 206 may be configured to extract an element from a position in the 1D table matrix corresponding to the number of bits to be refined in that bit-plane. The 1D table matrix may be also determined based on the equation 3 as follows:

$$T=S*(A[W-1][W-1]*B^T[0:W-2]) \quad (3)$$

where "T" represents the 1D table matrix, A[0] represents a lower triangular matrix of size "W−1" that has '1' at all the positions lower than the main diagonal, and B[ ] represents a row matrix of size "W−1" that has a sequence of numbers from 0 to "W−2". Referring to table 1, the 1D table matrix, "T", may be determined based on equation 3, as follows:

$$T=[0\ 3\ 9\ 18\ 30\ 45\ 63].$$

In accordance with an embodiment, the encoder circuitry 206 may be configured to determine a number of refinement bits of the plurality of un-coded bits that are available for refinement. The encoder circuitry 206 may be further configured to generate the random number based on the determined number of refinement bits. The random number can possibly have any positive integral value. Thus, to ensure that the "1stPos" lies within the bit-plane, the modulus operation may be performed which gives the value of "1stPos" between 0 to "W−1". In an exemplary implementation, the random number may be considered as a number that is equal to the number of the refinement bits.

In accordance with an embodiment, the encoder circuitry 206 may be configured to determine the random bit based on a last bit in the data block. As observed in the equation 1, the random bit may be multiplied with a number that is half of the block size of the 1D image block. This multiplication may ensure that the distribution of the refinement bits in the bit-plane is perfectly uniform (i.e., equally spaced). In other words, the probability of placing a refinement bit in the bit-plane is equal for all the bit-positions. For RB=0 a specific refinement order may be obtained and for RB=1, a different refinement order may be obtained that will be shifted by half of the block size with respect to the specific refinement order. In other words, two refinement start positions may be determined based on the bit value of the random bit.

In conventional refinement techniques, a fixed refinement order is followed in which every data block is refined in a similar order, which results in non-uniformity in the distribution of refinement bits in the bit-plane. In other words, the bit-position that will be refined first is fixed for all the data blocks which reduces probability of refining other bit-positions. For example, if a fixed refinement order, say left to right refinement order, is applied on the data block of table 1, then the refinement order for refining 3 bits in BP5 will be 1, 2, and 3 bit-positions as shown in Table 3:

TABLE 3

Left to Right Refinement Order

| | n | | | | | | | |
|---|---|---|---|---|---|---|---|---|
| | 1 | 2 | 3 | 4 | 5 | 6 | 7 | 8 |
| BP5 | 1 | 1 | 1 | 0 | 0 | 0 | 0 | 0 |

Therefore, the probability of refining the n=1 bit-position will be 100% for all the data blocks. This results in a coding artifact of a vertical stripe pattern in the decoded image of the data blocks. The vertical stripes are distributed at equal intervals corresponding to the block size of the data block in the decoded image. In every data block the leftmost bit-position is refined in a bit-plane and remaining bit-positions may not get refined, which results in degradation of resolution of the decoded image. Thus, the random refinement order for refining the data blocks ensures that the probability of refining any bit-position in the bit-plane is equal for all the bit-positions. As a result, the refinement bits are uniformly placed in the bit-plane in each of the data blocks that provides an improved resolution as compared to conventional techniques.

Figure 3:
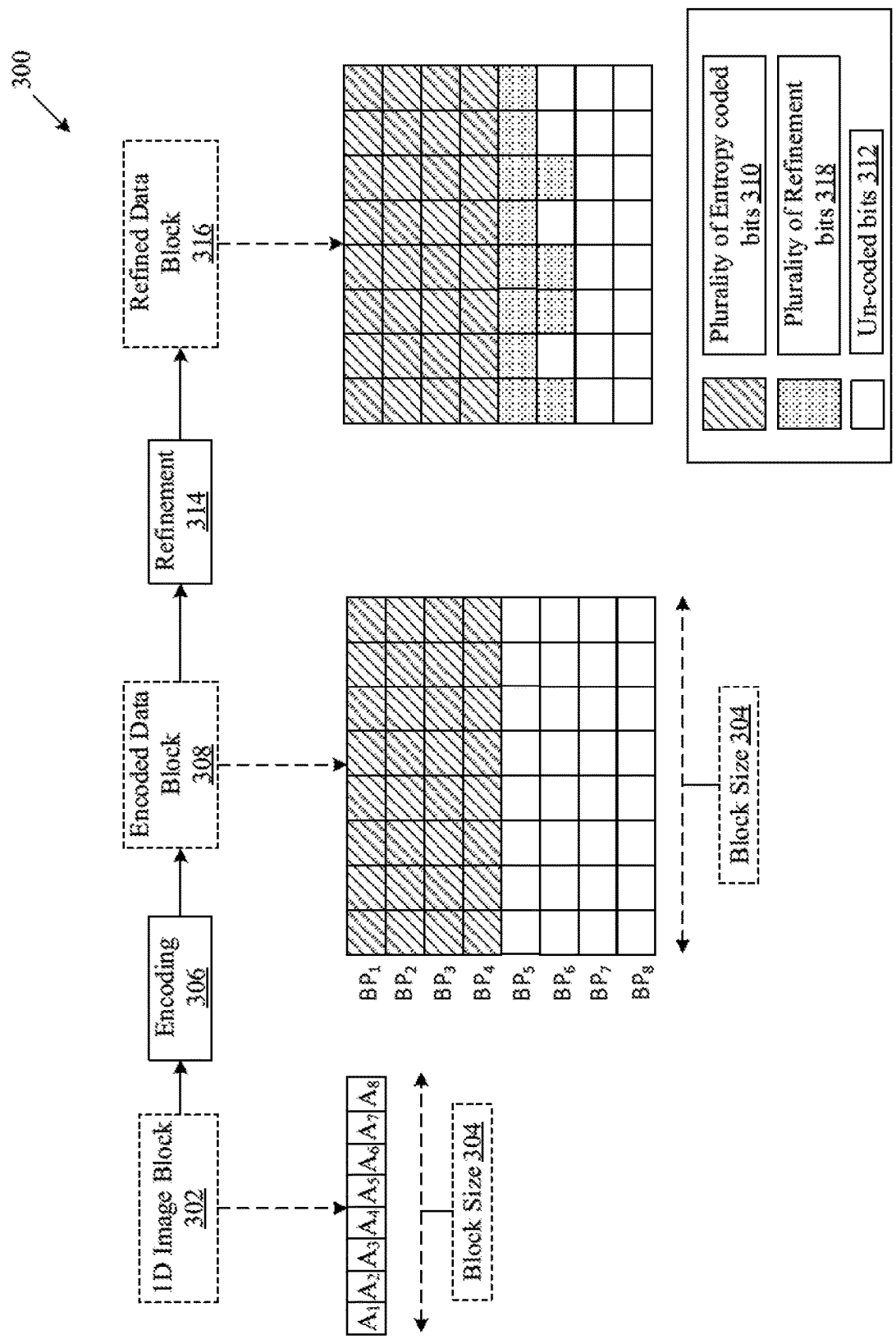
FIG. 3 illustrates a refinement scheme operated by the EBC circuitry of FIG. 2, in accordance with an embodiment of the disclosure.

FIG. 3 is a block diagram that illustrates a refinement scheme used by the EBC circuitry of FIG. 2, in accordance with an embodiment of the disclosure. FIG. 3 is explained in conjunction with elements from FIGS. 1 and 2. With reference to FIG. 3, there is shown a block diagram 300 that shows a sequence of operations applied on a 1D image block 302. It should be noted that other operations can also be applied on the 1D image block 302, without a deviation from the scope of the disclosure.

In the block diagram 300, the 1D image block 302 includes a plurality of pixel values $A_1$ to $A_8$ that indicates a block size 304. Alternatively stated, the block size 304 may be defined as the number of the plurality of pixel values ('8' in this case). The 1D image block 302 may be subjected to encoding 306 in which the plurality of pixel values $A_1$ to $A_8$ in the 1D image block 302 may be encoded to generate an encoded data block 308. Although not shown in FIG. 3, the encoding 306 may include quantization and entropy coding. The encoded data block 308 includes a plurality of bit-planes $BP_1, \ldots, BP_8$ and has the block size 304. The plurality of bit-planes $BP_1, \ldots, BP_8$ in the encoded data block 308 may include a plurality of entropy coded bits 310 in the bit-planes $BP_1$ to $BR_4$ and a plurality of un-coded bits 312 in the bit-planes $BP_5$ to $BP_8$. After encoding 306, the encoded data block 308 may be subjected to refinement 314 in which the plurality of un-coded bits 312 in the bit-planes $BP_5$ and $BP_6$ may be refined to generate a refined data block 316. The refined data block 316 may include the plurality of entropy coded bits 310 in the bit-planes $BP_1$ to $BR_4$, a plurality of refinement bits 318 in the bit-planes $BP_5$ and $BP_6$, and the plurality of un-coded bits 312 in the bit-planes $BP_6$ to $BP_8$. The number of the plurality of un-coded bits 312 in the refined data block 316 may be less as compared to the encoded data block 308.

In the encoding 306, the plurality of pixel values $A_1$ to $A_8$ in the 1D image block 302 may be encoded to generate the encoded data block 308. Although not shown in FIG. 3, the plurality of pixel values $A_1$ to $A_8$ in the 1D image block 302 may be first quantized to generate a plurality of quantized values in the 1D image block 302. The plurality of quantized values may be then entropy coded using an entropy coding scheme to generate the plurality of entropy coded bits 310 in the encoded data block 308. The entropy coding scheme may include, but is not limited to, a Huffman coding scheme, an exponential Golomb coding scheme, a progressive Golomb coding scheme, a Golomb-Rice coding scheme, and a combination of the Huffman coding scheme and the exponential Golomb coding scheme. The entropy coding scheme may further include, but is not limited to, a variable length coding scheme. It should be noted that the encoding block 306 is not limited to application of the quantization scheme and the entropy coding scheme only. The encoding 306 may further include, but is not limited to, application of the quantization scheme, followed by a transform coding, and the entropy coding scheme. The transform coding may include, but is not limited to, type I-VIII Discrete Cosine Transform (DCT), type I-VIII Discrete Sine Transform (DST), Discrete Wavelet Transform (DWT), and a Dual-Tree Complex Wavelet Transform (DCWT). As the encoded data block 308 may include the plurality of un-coded bits 314 as well, these un-coded bits may be further refined to improve the resolution and details of a decoded image of the 1D image block.

In the refinement 314, the plurality of un-coded bits 314 may be refined by allocating the plurality of refinement bits 318 in the bit-planes $BP_5$ and $BP_6$. The allocation of the plurality of refinement bits 318 may be performed in a refinement order that may be determined based on a refinement start position and a refinement step size. The refinement start position may be a random position in the bit-planes $BP_5$ and $BP_6$. Initially, a total number of the plurality of refinement bits 318 may be determined, in this case the total number of the plurality of refinement bits 318 is '12'. As the total number exceeds the available bit-positions (i.e., 8) in the bit-plane $BP_5$, the plurality of refinement bits 318 may be allocated in different (e.g., next bit plane) bit-planes $BP_5$ and $BP_6$. Now, the number of refinement bits 318 that may be allocated in the $BP_5$ is '8' and a number of refinement bits 318 that may be allocated in the $BP_6$ is '4'. The refinement start positions in the bit-planes $BP_5$ and $BP_6$ may be determined based on random numbers that may be equal to '8' and '4' respectively. The refinement step size may be determined based on the block size 304 such that a multiple value of the refinement step size is not equal to the block size 304. The refinement step size may be fixed for the bit-planes $BP_5$ and $BP_6$. Then, the refinement orders in the bit-planes $BP_5$ and $BP_6$ may be determined starting with the refinement start positions and incrementing thereafter by the refinement step size. Finally, the plurality of refinement bits 318 may be allocated in the bit-planes $BP_5$ and $BP_6$ in accordance with the refinement orders.

Figure 4:
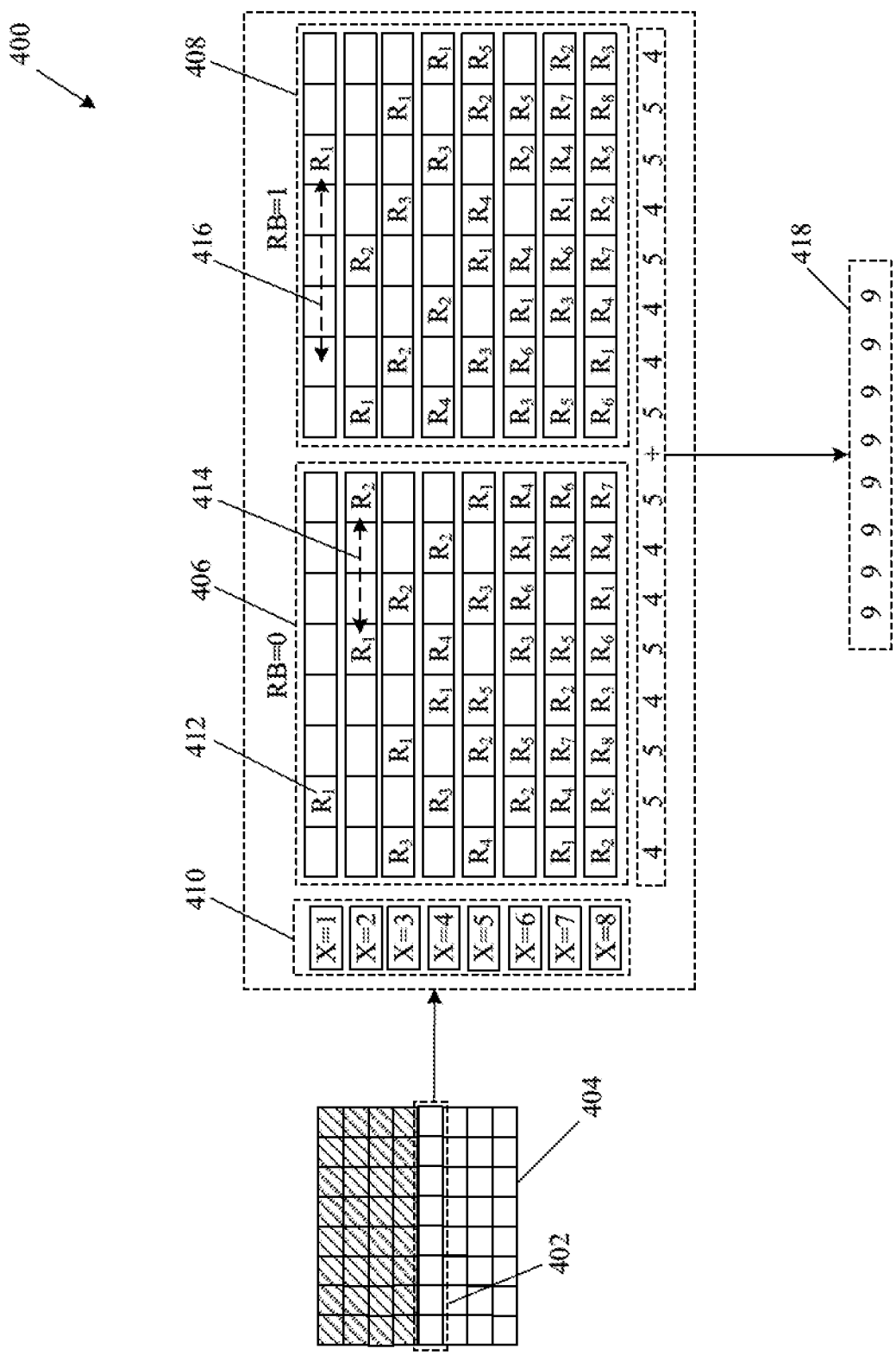
FIG. 4 illustrates a distribution of refinement bits in a bit-plane of an encoded data block refined by the EBC circuitry of FIG. 2, in accordance with an embodiment of the disclosure.

FIG. 4 illustrates a distribution of a number of refinement bits in a bit-plane of an encoded data block refined by the EBC circuitry of FIG. 2, in accordance with an embodiment of the disclosure. FIG. 4 is explained in conjunction with elements from FIGS. 1, 2, and 3. With reference to FIG. 4, there is shown a diagram 400 that shows arrangements of refinement bits in a bit-plane 402 of an encoded data block 404, corresponding to bit values of a random bit (RB=0 and RB=1).

In FIG. 4, an arrangement 406 of refinement bits corresponding to RB=0 and an arrangement 408 of refinement bits corresponding to RB=1 are shown. The arrangements 406 and 408 may depict placement of the refinement bits in the bit-plane 402 for a number of refinement bits 410. The bit-plane 402 may include a plurality of un-coded bits that may be refined. The number of refinement bits 410 ("X") varies from X=1 to X=8 based on the number of un-coded bits available for refinement. Consequently, the refinement bits may vary from $R_1$ for X=1 to $R_1$ to $R_8$ for X=8 in the bit-plane 402, where "$R_1$" may denote a refinement bit that may be allocated first, "$R_2$" may denote a refinement bit that may be allocated second, and so on.

The encoder circuitry 206 may be configured to determine a refinement start position 412 based on the equation 1. The encoder circuitry 206 may be further configured to determine a refinement step size 414 based on a block size of the encoded data block 404. The block size of the encoded data block may be equal to the number of total bit-positions present in the bit-plane 402 i.e., equal to a block size of a 1D image block from which the encoded data block 404 may be obtained. The refinement step size 414 may be determined such that any multiple value of the refinement step size is not equal to the block size of the encoded data block, which may ensure that entire bit-plane 402 will be covered without any overlap. For example, consider the case of X=3 (when there are 3 refinement bits) and the refinement step size 414=4. In this scenario, a multiple value (4N=8, for N=2) of the refinement step size 414 is equal to the block size of the encoded data block 404. The refinement start position (for $R_1$) may be determined as '3', the position of "$R_2$" may be as '7' (i.e., 3+4), and the position of "$R_3$" may be again as '3' (i.e., 7+4%8). Thus, "$R_3$" will be allocated at a location that was already occupied by "$R_1$" and effective number of refinement bits is reduced to X=2 ($R_2$ and $R_3$ only).

In arrangement 406 of refinement bits, the random number (RN) and the refinement step size (S) may be '2' and '3', respectively. The encoder circuitry 206 may be configured to determine the refinement start position 412 (position of $R_1$) in the bit-plane 402 based on RN=2, S=3, RB=0, and X. Thereafter, the encoder circuitry 206 may be configured to determine the positions for the subsequent refinement bits ($R_2$, $R_3$ . . . , $R_8$) by adding the refinement step size 414 to the position of the previous refinement bits ($R_1$, $R_2$, . . . $R_7$).

In arrangement 408 of refinement bits, the random number (RN) and the refinement step size (S) may be '2' and '3', respectively. The encoder circuitry 206 may be configured to determine the refinement start position 412 (position of refinement bit $R_1$) in the bit-plane 402 based on RN=2, S=3, RB=1, and X. Thereafter, the encoder circuitry 206 may be configured to determine the positions for the subsequent refinement bits ($R_2$, $R_3$, . . . , $R_8$) by adding the refinement step size 414 to the position of the previous refinement bits ($R_1$, $R_2$, . . . , $R_7$). The position of refinement bit $R_1$ in the arrangement 408 may be shifted by a half block size distance 416 (in terms of bit-positions) as compared to the arrangement 406, as "RB=1" in equation 1 may add half of the block size to the position of refinement bit $R_1$ in the arrangement 406. Consequently, the positions of refinement bits $R_2$, $R_3$, . . . , $R_8$ in the arrangement 408 may also be shifted by the half block size distance 416 as compared to the arrangement 406.

In the FIG. 4, below the arrangements 406 and 408, there is shown a distribution of refinement bits 418 in terms of the number of refinement bits that may be allocated at a position in the bit-plane 402. It can be seen that the distribution of refinement bits 418 is uniform (or an equal number of refinement bits can be allocated at a position) throughout the bit-plane 402. In other words, a probability of refining an un-coded bit at a position in the bit-plane 402 is equal for all the positions in the bit-plane. If only a single arrangement (406 or 408) is considered, then the distribution of refinement bits 418 may be almost similar i.e., either 4 or 5. But, in order to make it perfectly uniform the random bit may be used for determining the refinement start position 412 as it renders the distribution of refinement bits 418 equal i.e., 9. It can be also seen that the position of refinement bit $R_1$ for X=3 is '3' positions (equal to the refinement step size 414) shifted from the position of refinement bit $R_2$ for X=2 (last refinement bit), which is due to the summation operator in the equation 1. This further ensures that the distribution of the refinement bits 418 is uniform throughout the bit-plane 402. In other words, a probability of refining a particular bit position in one bit plane is same (equal or approximately equal).

The refinement start position 412 may be determined based only on the random number (RN) to refine the un-coded bits, but that may not make the distribution of the refinement bits 418 perfectly uniform. Therefore, the refinement start position 412 may be determined based on the random number, the random bit, and the summation of a sequence of numbers starting from 0 to a count of refinement bits that may be one less than the number of refinement bits 410.

Figure 5:
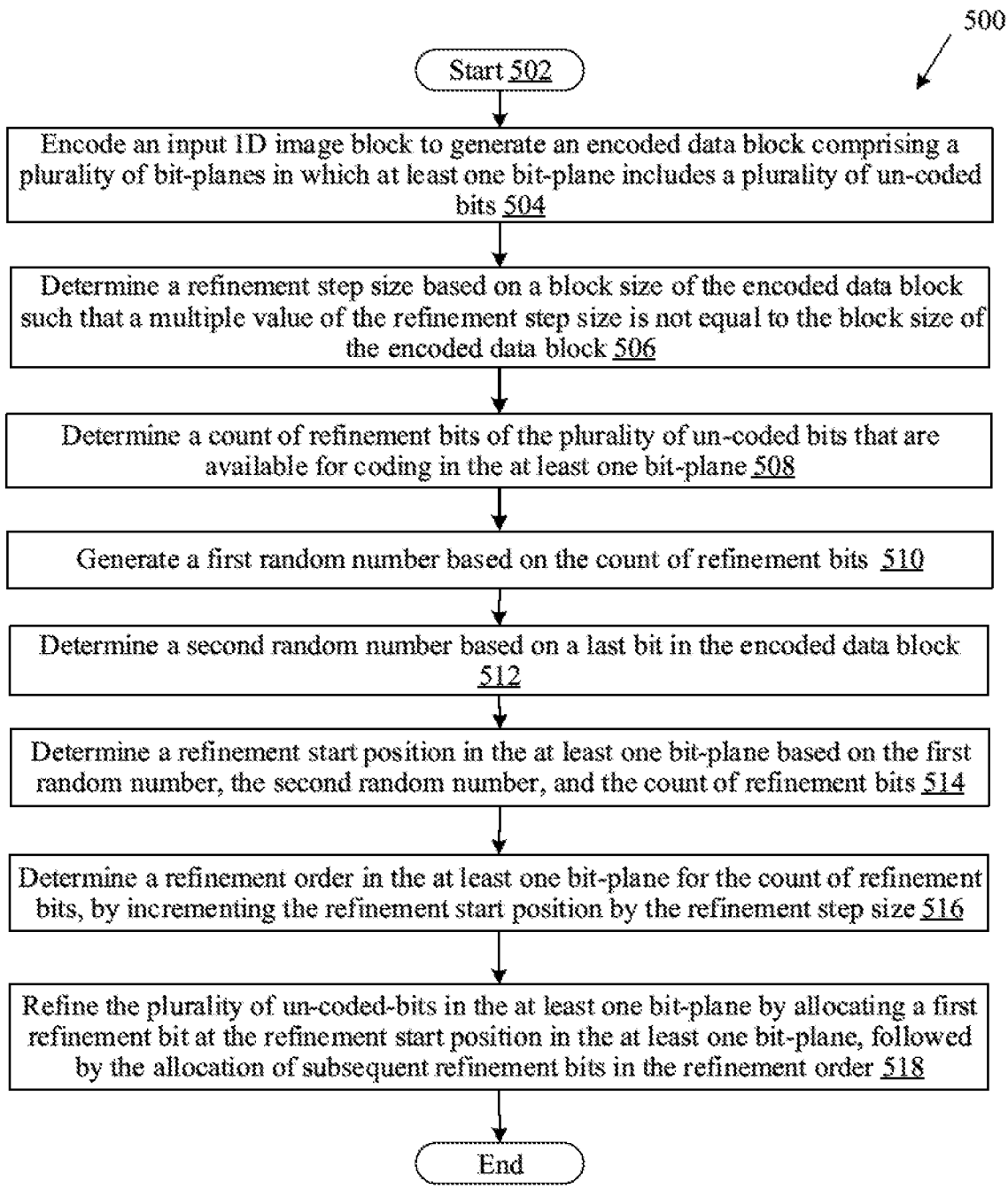
FIG. 5 depicts a flowchart that illustrates an exemplary method for randomized refinement of un-coded bits, in accordance with an embodiment of the disclosure.

FIG. 5 depicts a flowchart that illustrates an exemplary method for randomized refinement of un-coded bits, in accordance with an embodiment of the disclosure. FIG. 5 is explained in conjunction with elements from FIGS. 1, 2, 3, and 4. With reference to FIG. 5, there is shown a flowchart 500 implemented in the EBC circuitry 108. The method starts at 502 and proceeds to 504.

At 504, an input 1D image block may be encoded to generate an encoded data block comprising a plurality of bit-planes in which at least one bit-plane include a plurality of un-coded bits. The encoder circuitry 206 may be configured to encode the input 1D image block to generate the encoded data block that has the plurality of bit-planes. Then, the method proceeds to 506.

At 506, a refinement step size may be determined based on a block size of the encoded data block such that a multiple value of the refinement step size is not equal to the block size of the encoded data block. The block size of the encoded data block may be equal to the block size of the input 1D image block and the refinement step size may be fixed for all the bit-planes in the encoded data block. The encoder circuitry 206 may be configured to determine the refinement step size for the encoded data block based on the block size of the encoded data block.

At 508, a count of refinement bits of the plurality of un-coded bits that may be available for coding in at least one bi-plane may be determined. The encoder circuitry 206 may be configured to determine the count of refinement bits of the plurality of un-coded bits that are available for refinement in the at least one bit-plane.

At 510, a first random number may be generated based on the determined count of the refinement bits. The first random number may be equal to the count of the refinement bits. The encoder circuitry 206 may be configured to generate the first random number based on the determined count of the refinement bits.

At 512, a second random number may be determined based on a last bit in the encoded data block. The second random number may be a bit that may be equal to '0' or '1' corresponding to the value of the last bit. The encoder circuitry 206 may be configured to determine the second random number based on the last bit in the encoded data block.

At 514, a refinement start position in at least one bit-plane may be determined based on the first random number, the second random number, and the count of the refinement bits. The refinement start position in a bit-plane may be a position at which the refinement bit will be allocated first. The encoder circuitry 206 may be configured to determine the refinement start position in the at least one bit-plane based on the first random number, the second random number, and the count of the refinement bits.

At 516, a refinement order in at least one bit-plane may be determined for the count of refinement bits, by incrementing the refinement start position by the refinement step size. The refinement order in at least one bit-plane may be a sequence of positions in the at least bit-plane that will be refined in that sequence. The refinement order may be determined by adding the refinement step size to the refinement start position or a previous refinement bit position. The encoder circuitry 206 may be configured to determine the refinement order in the at least one bit-plane for the count of refinement bits, by incrementing the refinement start position by the refinement step size.

At 518, the plurality of un-coded bits in the at least one bit-plane may be refined by allocation of a first refinement bit at the refinement start position, followed by the allocation of the subsequent refinement bits in the refinement order. The encoder circuitry 206 may be configured to refine the plurality of un-coded bits in the at least one bit-plane by allocation of the first refinement bit at the refinement start position, followed by the allocation of the subsequent refinement bits in the refinement order. The control may proceed to end.

Certain embodiments of the disclosure may be found in an embedded codec (EBC) circuitry (e.g., the EBC circuitry 108 (FIG. 1)). Various embodiments of the disclosure may provide the EBC circuitry that may include an encoder circuitry (e.g., the encoder circuitry 206 (FIG. 2)). The encoder circuitry may be configured to encode a 1D image block (e.g., the 1D image block 302 (FIG. 3)) to generate an encoded data block (e.g., the encoded data block 308 (FIG. 3)) that has a plurality of bit-planes. The plurality of bit-planes comprise a plurality of entropy coded bits (e.g., the plurality of entropy coded bits 310 (FIG. 3)) and the plurality of un-coded bits (e.g., the un-coded bits 312 (FIG. 3)). The encoder circuitry may be further configured to determine a refinement step size (e.g., the refinement step size 414 (FIG. 4)) for the encoded data block based on a block size of the encoded data block (e.g., the block size 304 (FIG. 3)). The block size of the encoded data block is equal to a block size of the 1D image block. The encoder circuitry may be further configured to determine a refinement start position (e.g., the refinement start position 412 (FIG. 4)) in at least one bit-plane (e.g., the bit-plane 402 (FIG. 4)) of the plurality of bit-planes based on a random number. The refinement start position is a position of an un-coded bit in the at least one bit-plane that will be refined first. The random number may be generated based on a count of refinement bits to be allocated in the at least one bit-plane. The encoder circuitry may be further configured to determine a refinement order in the at least one bit-plane based on the refinement start position and the refinement step size. The encoder circuitry may be further configured to refine the un-coded bits in the at least one bit-plane by allocation of a refinement bit (e.g., the refinement bit $R_1$ (FIG. 4)) at the refinement start position and then followed by the allocation of subsequent refinement bits (e.g., the refinement bits $R_2$, $R_3$, . . . , $R_8$ (FIG. 4)) in the determined refinement order.

In accordance with an embodiment, the encoder circuitry may be further configured to allocate a next refinement bit at a position in the at least bit-plane after the allocation of the refinement bit at the refinement start position. The position of the next refinement bit corresponds to the refinement step size added to the refinement start position.

In accordance with an embodiment, the encoder circuitry may be further configured to determine the refinement start position in the at least one bit-plane based on the random number and a random bit. The refinement start position may be equal to a first position or a second position in the at least one bit-plane based on a bit value of the random bit. The second position and the first position have a gap size equal to half of the block size of the encoded data block (e.g., the half-block size distance 416 (FIG. 4)), between them. The encoder circuitry may be further configured to determine the bit value of the random bit based on a last bit in the encoded data block.

In accordance with an embodiment, the encoder circuitry may be further configured to determine the refinement step size such that a multiple value of the refinement step size is less than or greater than the block size of the encoded data block. Alternately, the multiple value of the refinement step size is not equal to the block size of the encoded data block. Also, the refinement step size may be fixed for the plurality of bit-planes in the encoded data block.

In accordance with an embodiment, the encoder circuitry may be further configured to determine a 1D table matrix based on the determined refinement step size and the block size of the encoded data block. The encoder circuitry may be further configured to store the 1D table matrix in an external or an on-chip memory (e.g., the external memory 110 or the on-chip memory 204 (FIG. 2)). The encoder circuitry may be further configured to determine the refinement start position in the at least one bit-plane based on the random number and an element of the 1D table matrix. A position of the element in the 1D table matrix may be equal to the count of the refinement bits to be allocated in the at least one bit-plane.

In accordance with an embodiment, the encoder circuitry may be further configured to determine the count of refinement bits of the plurality of un-coded bits that are available for refinement in the at least one bit-plane. The encoder circuitry may be further configured to generate the random number based on the determined count of refinement bits. The value of the random number may be equal to the count of the refinement bits.

In accordance with an embodiment, the encoder circuitry may be further configured to determine the refinement start position in the at least one bit-plane based on the random number, a random bit, and a summation of a sequence of the count of refinement bits. The sequence of the count of refinement bits may start from 0 to a value that is one less than the count of the refinement bits.

In accordance with an embodiment, the 1D image block may include a plurality of pixel values (e.g., $A_1$ to $A_8$ (FIG. 3)). The encoder circuitry may be further configured to quantize the plurality of pixel values in the 1D image block to generate a plurality of quantized values in the 1D image block. The encoder circuitry may be further configured to encode the plurality of quantized values in the 1D image block to generate the encoded data block based on application of an entropy coding scheme on the plurality of quantized values.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An embedded codec (EBC) circuitry, comprising:
   encoder circuitry configured to:
   encode a one dimensional (1D) image block to generate an encoded data block comprising a plurality of bit-planes, wherein at least one bit-plane of the plurality of bit-planes comprises a plurality of un-coded bits;
   determine a refinement step size for the encoded data block based on a block size of the encoded data block, wherein the block size of the encoded data block is equal to a block size of the 1D image block;
   determine a refinement start position in the at least one bit-plane, based on a first random number, wherein the first random number is generated based on a count of a plurality of refinement bits, and wherein the determined refinement start position is a first position in the at least one bit-plane based on a value of the first random number;
   determine a refinement order for the at least one bit-plane based on the determined refinement start position and the determined refinement step size; and
   refine the plurality of un-coded bits by allocation of a first refinement bit of the plurality of refinement bits at the first position in the at least one bit-plane followed by allocation of subsequent refinement bits of the plurality of refinement bits based on the determined refinement order.

2. The EBC circuitry according to claim 1, wherein the encoder circuitry is further configured to allocate a second refinement bit of the plurality of refinement bits at a second position in the at least one bit-plane after the allocation of the first refinement bit, wherein the determined refinement step size corresponds to a gap size between the first position and the second position in the at least one bit-plane.

3. The EBC circuitry according to claim 1, wherein the encoder circuitry is further configured to determine the refinement start position in the at least one bit-plane based on the first random number and a second random number,
   wherein the determined refinement start position is one of the first position or a second position in the at least one bit-plane,
   wherein the first position corresponds to a binary '0' value of the second random number and the second position corresponds to a binary '1' value of the second random number, and
   wherein the second position is shifted from the first position by half of the block size of the encoded data block.

4. The EBC circuitry according to claim 3, wherein the encoder circuitry is further configured to determine a bit value of the second random number based on a last bit in the encoded data block.

5. The EBC circuitry according to claim 1, wherein the refinement step size is fixed for the plurality of bit-planes, and wherein the refinement step size is determined such that a multiple value of the refinement step size is less than the block size of the encoded data block or greater than the block size of the encoded data block.

6. The EBC circuitry according to claim 1, wherein the encoder circuitry is further configured to:
   determine a 1D table matrix based on the determined refinement step size and the block size of the encoded data block;
   store the 1D table matrix in a memory; and
   determine the refinement start position in the at least one bit-plane, based on the first random number and an element of the 1D table matrix, wherein a position of the element in the 1D table matrix corresponds to the count of the plurality of refinement bits.

7. The EBC circuitry according to claim 1, wherein the encoder circuitry is further configured to determine the count of the plurality of refinement bits of the plurality of un-coded bits that are available for refinement, wherein the first random number is generated based on the determined count of the plurality of refinement bits, and wherein the value of the first random number is equal to the count of the plurality of refinement bits.

8. The EBC circuitry according to claim 1, wherein the encoder circuitry is further configured to determine the refinement start position in the at least one bit-plane, based on the first random number, a second random number, and a summation of a sequence of the count of the plurality of refinement bits, wherein the sequence is from zero to a previous value of the count of the plurality of refinement bits.

9. The EBC circuitry according to claim 1, wherein the 1D image block comprises a plurality of pixel values, and wherein the encoder circuitry is further configured to:
   quantize the plurality of pixel values in the 1D image block to generate a plurality of quantized values in the 1D image block; and
   encode the plurality of quantized values to generate the encoded data block based on an entropy coding scheme.

10. The EBC circuitry according to claim 1, wherein the refinement start position for a first number of refinement bits and the refinement start position for a second number of refinement bits differ by the refinement step size, and wherein the first number of refinement bits and the second number of refinement bits have a unit difference.

11. A method, comprising:
   in an embedded codec (EBC) circuitry:
      encoding a one dimensional (1D) image block to generate an encoded data block comprising a plurality of bit-planes, wherein at least one bit-plane of the plurality of bit-planes comprises a plurality of un-coded bits;
      determining a refinement step size for the encoded data block based on a block size of the encoded data block, wherein the block size of the encoded data block is equal to a block size of the 1D image block;
      determining a refinement start position in the at least one bit-plane, based on a first random number, wherein the first random number is generated based on a count of a plurality of refinement bits, and wherein the determined refinement start position is a first position in the at least one bit-plane based on a value of the first random number;
      determining a refinement order for the at least one bit-plane based on the determined refinement start position and the determined refinement step size; and
      refine the plurality of un-coded bits by allocation of a first refinement bit of the plurality of refinement bits at the first position in the at least one bit-plane followed by allocation of subsequent refinement bits of the plurality of refinement bits based on the determined refinement order.

12. The method according to claim 11, further comprising allocating a second refinement bit of the plurality of refinement bits at a second position in the at least one bit-plane after the allocation of the first refinement bit, wherein the determined refinement step size corresponds to a gap size between the first position and the second position in the at least one bit-plane.

13. The method according to claim 11, further comprising determining the refinement start position in the at least one bit-plane based on the first random number and a second random number,
   wherein the determined refinement start position is one of the first position or a second position in the at least one bit-plane,
   wherein the first position corresponds to a binary '0' value of the second random number and the second position corresponds to a binary '1' value of the second random number, and
   wherein the second position is shifted from the first position by half of the block size of the encoded data block.

14. The method according to claim 13, further comprising determining a bit value of the second random number based on a last bit in the encoded data block.

15. The method according to claim 11, wherein the refinement step size is fixed for the plurality of bit-planes, and wherein the refinement step size is determined such that a multiple value of the refinement step size is less than the block size of the encoded data block or greater than the block size of the encoded data block.

16. The method according to claim 11, further comprising:
   determining a 1D table matrix based on the determined refinement step size and the block size of the encoded data block;
   storing the 1D table matrix in a memory; and
   determining the refinement start position in the at least one bit-plane, based on the first random number and an element of the 1D table matrix, wherein a position of the element in the 1D table matrix corresponds to the count of the plurality of refinement bits.

17. The method according to claim 11, further comprising:
   determining the count of the plurality of refinement bits of the plurality of un-coded bits that are available for refinement; and
   generating the first random number based on the determined count of the plurality of refinement bits, wherein the value of the first random number is equal to the count of the plurality of refinement bits.

18. The method according to claim 11, further comprising determining the refinement start position in the at least one bit-plane, based on the first random number, a second random number, and a summation of a sequence of the count of the plurality of refinement bits, wherein the sequence is from zero to a previous value of the count of the plurality of refinement bits.

19. The method according to claim 11, further comprising:
   quantizing a plurality of pixel values in the 1D image block to generate a plurality of quantized values in the 1D image block; and
   encoding the plurality of quantized values to generate the encoded data block based on an entropy coding scheme.

* * * * *